(12) United States Patent
Pories et al.

(10) Patent No.: US 6,784,795 B1
(45) Date of Patent: Aug. 31, 2004

(54) BRAKE AND SIGNAL LIGHT SYSTEM

(75) Inventors: Muriel Pories, Laguna Beach, CA (US); John Dent, Claremont, CA (US); Marcus Escobosa, Lake Forest, CA (US)

(73) Assignee: Mar-Bruc, Inc., Laguna Beach, CA (US)

( * ) Notice: Subject to any disclaimer, the term of this patent is extended or adjusted under 35 U.S.C. 154(b) by 0 days.

(21) Appl. No.: 10/430,749

(22) Filed: May 6, 2003

(51) Int. Cl.$^7$ ................................................. B60Q 1/44
(52) U.S. Cl. ................. 340/479; 340/464; 340/468; 455/39; 455/41.2; 362/105; 362/106
(58) Field of Search ................................. 340/479, 483, 340/488, 464, 465, 468; 455/39, 41.2, 66.1, 74, 346, 344, 127.1; 362/105, 106, 473, 802, 570

(56) References Cited

U.S. PATENT DOCUMENTS

| | | | | |
|---|---|---|---|---|
| 4,115,757 A | * | 9/1978 | Blahunka | 340/906 |
| 4,891,736 A | * | 1/1990 | Gouda | 362/105 |
| 5,426,792 A | * | 6/1995 | Murasko | 2/422 |
| 5,463,374 A | * | 10/1995 | Mendez et al. | 340/442 |
| 6,406,168 B1 | * | 6/2002 | Whiting | 362/473 |
| 6,529,126 B1 | * | 3/2003 | Henry | 340/467 |
| 2002/0177406 A1 | * | 11/2002 | O'Connor et al. | 455/39 |
| 2003/0122660 A1 | * | 7/2003 | Kachouh et al. | 340/442 |
| 2003/0137413 A1 | * | 7/2003 | Morse | 340/468 |

FOREIGN PATENT DOCUMENTS

| | | | |
|---|---|---|---|
| GB | 2331801 | * | 11/1999 |
| IL | WO 98/36213 | * | 8/1998 |

* cited by examiner

*Primary Examiner*—Daniel J. Wu
*Assistant Examiner*—Son Tang
(74) *Attorney, Agent, or Firm*—Stephen Lewellyn

(57) ABSTRACT

A brake and signal light system for use with a vehicle, such as a motorcycle and a helmet worn by a rider of the motorcycle. The system includes a transmitter mounted to the vehicle and electrically connected to the signaling circuitry of the vehicle for broadcasting a coded radio signal in response to a current passing through the signaling circuitry of the vehicle. A flexible housing is mounted the helmet and contains a receiver and at least one light source. The receiver receives the radio signal and at least one light source is illuminated indicating the state of the vehicle's signaling circuitry. The housing assembly includes a central portion, at least one left segmented housing, and at least one right segmented housing. A flexible back member flexibly connects the left and right segmented housing to the central portion.

18 Claims, 4 Drawing Sheets

BRAKE AND SIGNAL LIGHT SYSTEM

BACKGROUND OF THE INVENTION

1. Field of the Invention

The present invention relates to a brake and signal light system for use in connection with helmets generally worn by a rider of a motorcycle. The brake and signal light system has particular utility in connection with providing for a flexible, readily attachable and a wireless signal light for attachment to a helmet to increase the visibility of the rider and associated motoring signals, such as braking and turn indication.

2. Description of the Prior Art

Helmet signal systems are desirable for improving rider safety by increasing other motorists awareness of motorcycles and for providing an additional visual notification to the motorist as to the motoring operations or intentions of the motorcycle. In addition to providing such helmet light systems, it is very desirable to have a system that is wireless from the motorcycle. Wireless communication between the helmet signal system and the motorcycle signal system is convenient for the rider, whereby with added convenience it is thought that wide acceptance of the system by riders will be observed with increased occurrence of usage by the riders. Furthermore, wireless communication increases the rider safety by eliminating a physical wired connection between the rider and the motorcycle. This is extremely important in the case that a rider must lay the motorcycle down or is involved in a motor vehicle accident.

The use of helmet mounted signal lights is known in the prior art. For example, U.S. Pat. No. 4,760,373 to Reilly discloses a motorcycle helmet containing an automatic brake light. This patent to Reilly appears to be the first advancement in the art directed towards providing signal lights in helmets which are wireless and receive operational command signals from the motorcycle. This apparatus includes a helmet having an integrated brake signal light which is caused to illuminate upon receiving an encoded signal transmitted by a transmitter attached to the brake lever of a motor motorcycle. In operation, the transmitter produces an encoded signal when the brake lever is pressed. The receiver unit receives the encoded signal that includes a binary decoder which demodulates and decodes the signal. If the decoded signal matches a predetermined code within the receiver unit, the receiver unit turns on the brake light mounted within the helmet. However, the Reilly '373 patent does not provide a readily attachable light apparatus which is flexible and which conforms to various shaped helmets, and has further drawbacks of only providing indication of braking, and requiring a relatively high amount of energy for powering the helmet system. In addition, the invention of this patent does not provide a means for detecting an error in the coded signal.

The next advancement in the art appears to be U.S. Pat. No. 5,353,008 to Eikenberry et al. This patent discloses a remote controlled safety light system having a combined signal light and receiver unit that is attachable to the rearward portion of a motorcycle helmet. A transmitter unit is connected to a motorcycle for generating a command signal to control the illumination of the signal light unit. In addition, the receiver is duty cycled to reduce energy consumption and the transmitter is powered by the signal circuitry of the motorcycle. In operation, the transmitter produces an RF signal in response to a brake operation. The receiver receives and decodes the RF signal and produces a control signal in response to the RF signal to illuminate the brake signal indicator. This patent addresses some of the deficiencies inherent with the '373 patent to Reilly by providing for an attachable signal light apparatus and a system having lower power demands. However, the Eikenberry et al. '008 patent does not provide for a microprocessor based system, additionally does not include a segmented and flexible signal light apparatus, and makes no provisions for error detection within the coded signal.

Similarly, U.S. Pat. No. 5,477,209 to Benson, which is an improvement upon the '008 Eikenberry et al. patent, discloses a remote controlled safety light having increased noise discrimination. Like the '008 patent to Eikenberry et al. the apparatus of this patent includes a helmet attachable signal light apparatus having a receiver unit, and a transmitter unit. The main improvement in this patent over the '008 patent is the addition of noise discrimination to allow multiple receiver/transmitter pairs to operate in close proximity of each other.

Lastly, U.S. Pat. No. 6,406,168 to Whiting discloses a helmet mounted signaling system including a transmitter, a receiver, and a plurality of signal lights mounted to the rearward side of a helmet. The transmitter is microprocessor based and is connected to the signal circuitry of a vehicle, such as a motorcycle, so as to receive a voltage signal indicating the energization of the vehicle's indicator signals. Upon detecting energization of a vehicle signal, the transmitter generates and broadcasts an RF signal with an embedded function specific code. The receiver is also microprocessor based and receives the RF signal and in response to the function specific code illuminates a corresponding signal light mounted to the helmet. This patent recognizes the improvements in the art made by the '008 patent to Eikenberry by providing a motorcycle helmet with a brake light that includes a duty cycled receiver circuit for receiving a radio-frequency signal from a transmitter located on the motorcycle for reducing power demands. Rather than using a duty cycled receiver circuit, the apparatus of this patent uses a duty cycled power circuit to energize the brake lamp. The advancement in this apparatus recognizes that modern receiver circuits use relatively little power, and that most of the power that is dissipated in a helmet signal system is used to energize the lamps. However, the Whiting '168 patent does not provide for a segmented and flexible light apparatus for attachment to the rearward side of a helmet, and has the additional deficiency of not providing for signal error detection through the use of redundant data strings.

While the above-described devices fulfill their respective, particular objectives and requirements, the aforementioned patents do not describe a brake and signal light system that provides for a helmet safety light which is attachable to a motorcycle helmet, and which has a flexible and segmented right and left turn signals and a central brake light, and a micro-controller based transmitter and receiver system having data redundancy for error detection. The above discussed patents make no provisions for a micro-controller based system having error detection, and additionally do not include a segmented and flexible signal light apparatus that is readily attachable to various shaped helmets.

Therefore, a need exists for a new and improved brake and signal light system that provides for a flexible, readily attachable and a wireless signal light for attachment to a helmet to increase the visibility of the rider and associated motoring signals, such as braking and turn indication. In this regard, the present invention substantially fulfills this need. In this respect, the brake and signal light system according to the present invention substantially departs from the conventional concepts and designs of the prior art, and in doing so provides an apparatus primarily developed for the purpose of improving rider safety by increasing other motorists awareness of motorcycles and for providing an additional visual notification to the motorist as to the motoring operations or intentions of the motorcycle.

SUMMARY OF THE INVENTION

In view of the foregoing disadvantages inherent in the known types of helmet mounted signal lights now present in the prior art, the present invention provides an improved brake and signal light system for attachment to a helmet, and overcomes the above-mentioned disadvantages and drawbacks of the prior art. As such, the general purpose of the present invention, which will be described subsequently in greater detail, is to provide a new and improved brake and signal light system and method which has all the advantages of the prior art mentioned heretofore and many novel features that result in a brake and signal light system which is not anticipated, rendered obvious, suggested, or even implied by the prior art, either alone or in any combination thereof.

To attain this, the present invention includes a transmitter assembly mounted to a vehicle, such as a motorcycle, and connected to the signaling circuitry of the vehicle. The transmitter may be connected to the brake signal, left turn indication signal, right turn indication signal, running lights and hazard lights of the signaling circuitry of the vehicle. The transmitter broadcasts a signal, such as a radio-frequency signal, which is received by a transmitter. The transmitter is contained within a housing assembly which is secured to a helmet towards a rearward portion thereof. A light source, such as a light emitting diode (LED), is also contained within the housing assembly. The light source is caused to illuminate upon the radio signal being received by the receiver and is illuminated so as to indicate the present state of the signaling circuitry of the vehicle.

The transmitter assembly includes a conditioning circuit, a voltage regulator, a first micro-controller, and a transmitter circuit. The receiver includes a receiver circuit and a second micro-controller. Both the first and the second micro-controllers comprise random access memory and read-only memory. Additionally, the first and second micro-controller may be 8-bit micro-controllers.

The housing assembly includes a central housing and at least one segmented left housing and at least one segmented right housing. The segmented housing are positioned on either side of the central housing and are flexibly connected to the central housing by a flexible, resilient back member. When more than one segmented left housings or more than one segmented right housings are used, the left segmented housing are all flexibly connected to each other in a side-by-side relationship by the flexible back member. Like the left segmented housings the right segmented housings are connected to one another in the same fashion using the same flexible back member. The construction of the housing assembly allows it to be easily secured to the rearward portion of a helmet by bending or flexing it to conform to the contour of the helmet. Because several left and right segmented housings may be used, the housing assembly can be secured to an unlimited number of helmets having different shapes.

In addition to be being flexible, the housing assembly is fitted with lens elements in the central housing as well as each left or right segmented housing. The lens elements are provided so as to project the light source in the central housing and the light sources within the segmented housing outward therefrom. The lens elements may be frensel lenses.

In operation, a current is passed through the signaling circuitry of the vehicle by an operator manipulating a control element of the vehicle, such as a brake lever or a turn signal lever. This current is received by the conditioning circuit of the transmitter assembly and is conditioned to provide a raw electrical power and signaling data. The phrase raw electrical power means power, which has not been altered or regulated. This raw electrical power is feed to the voltage regulator which in turn generates a steady supply voltage to power the transmitter assembly. With this construction, an additional power source, such as a battery, or connection with the vehicle's power supply is not required, thus making the installation of the transmitter less complicated.

The signaling data is feed to the first micro-controller of the transmitter assembly where it processed to create a radio data pattern. The radio data pattern may include a sync pattern for bit alignment, a header to identify the beginning of the radio pattern, a command signal, and a data area with redundancy to allow for error detection. This radio data pattern is fed to the receiver circuit where it is modulated on a radio-frequency signal and then broadcasted. The radio-frequency signal is coded with a unique code to a particular transmitter/receiver pair. This allows multiple transmitter/receiver pairs to operate within close proximity to each other with out experiencing interference or erroneous commands.

The broadcasted signal is received by the receiver circuit where it is demodulated and then fed to the second micro-controller. The signal is then processed to check for signal authenticity to unsure the received signal originated from the correct source. If the signal is verified as and authentic signal, it is further processed to decode a command signal and to check the signal for possible errors. If no errors exist the command signal illuminates the light source to indicate the state of the signaling circuitry of the vehicle. A power source, such as a battery is also provided to power the transmitter and to power the light source. To save power, the transmitter is duty cycled and operated intermittently.

There has thus been outlined, rather broadly, the more important features of the invention in order that the detailed description thereof that follows may be better understood and in order that the present contribution to the art may be better appreciated.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved brake and signal light system that has all of the advantages of the prior art helmet mounted signal lights and none of the disadvantages.

It is another object of the present invention to provide a new and improved brake and signal light system that may be easily and efficiently manufactured and marketed.

An even further object of the present invention is to provide a new and improved brake and signal light system that has a low cost of manufacture with regard to both materials and labor, and which accordingly is then susceptible of low prices of sale to the consuming public, thereby making such an improved brake and signal light system economically available to the buying public.

Still another object of the present invention is to provide an improved brake and signal light system that provides in the apparatuses and methods of the prior art some of the advantages thereof, while simultaneously overcoming some of the disadvantages normally associated therewith.

Even still another object of the present invention is to provide an improved brake and signal light system having a flexible housing assembly that is attachable to a helmet and which conforms to the shape of the helmet.

Lastly, it is an object of the present invention to provide a new and improved brake and signal light system for use with a motorcycle to increase the visibility and safety of the motorcycle rider.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DETAILED DESCRIPTION OF THE INVENTION

Figure 1:
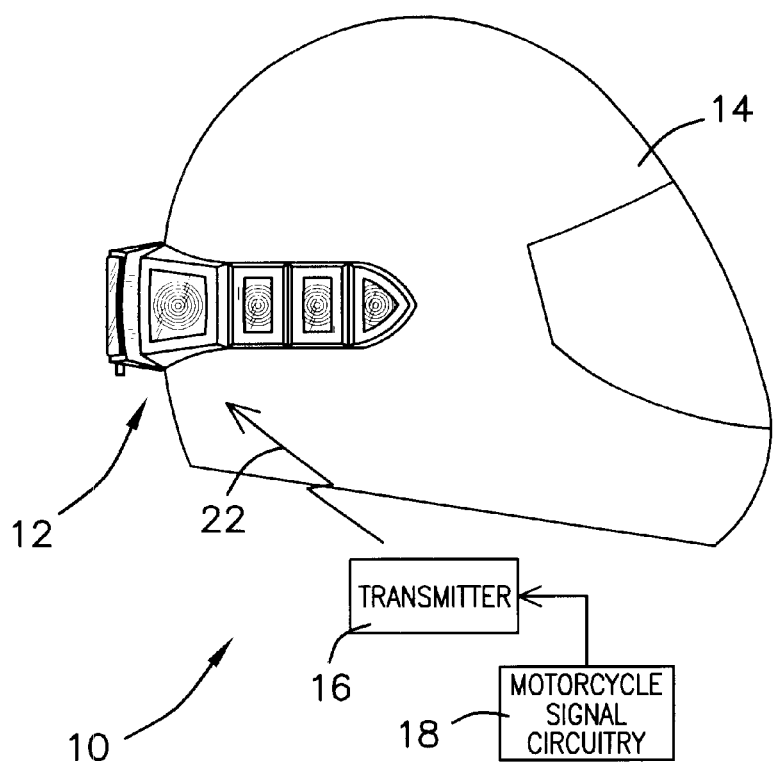
FIG. 1 is an in-use view of the preferred embodiment of the improved brake and signal light system constructed in accordance with the principles of the present invention.

Referring now to the drawings, and particularly to FIGS. 1–8, a preferred embodiment of the brake and signal light system of the present invention is shown and generally designated by the reference numeral 10.

Figure 2:
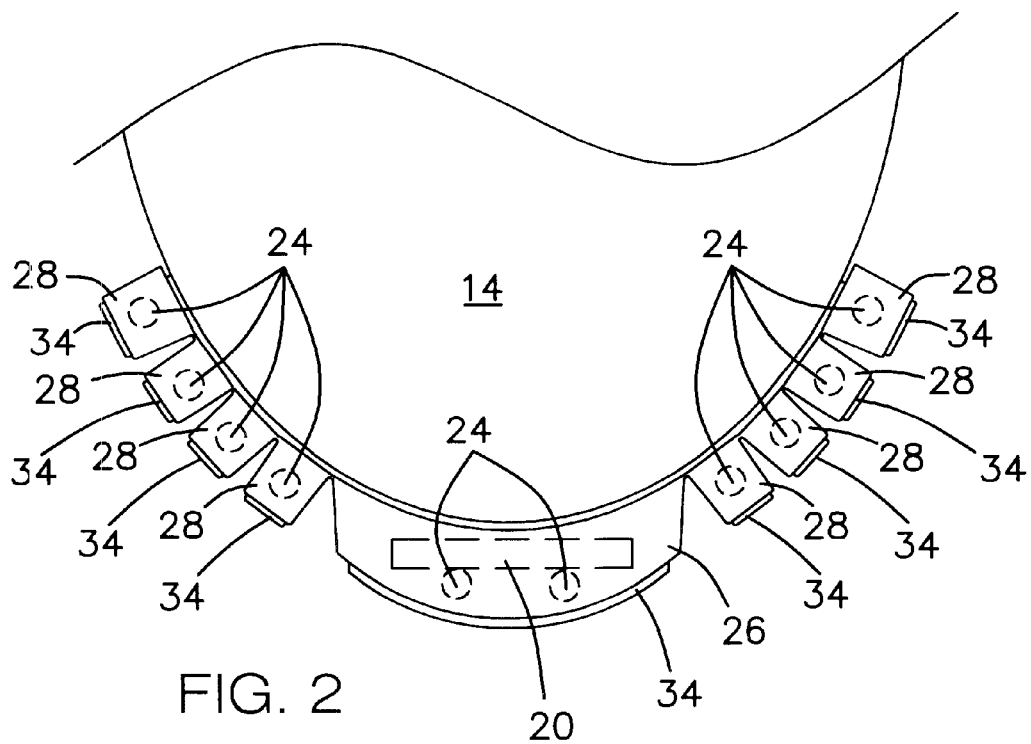
FIG. 2 is a top plan view of the improved brake and signal light system of the present invention secured to a rearward portion of a helmet.

In FIGS. 1 and 2, a new and improved brake and signal light system 10 of the present invention for providing a flexible and readily attachable wireless signal light for attachment to a helmet to increase the visibility of the rider and associated motoring signals, such as braking and turn indication is illustrated and will be described. More particularly, the brake and signal light system 10 has a housing assembly 12 which is secured to a rearward portion of a helmet 14. The housing assembly 12 is flexible as such when it is secured to the helmet 14 it flexes so as to curve around the helmet 14 and conform to the contour of the helmet. In addition, the present invention includes a transmitter assembly 16 which is mounted to a vehicle, such as a motorcycle and which is connected to the signaling circuitry 18 of the motorcycle. A transmitter assembly 20 is positioned within the housing assembly 12 and is adapted to receive a coded signal, such as a radio-frequency signal 22.

A brief discussion, with a more detailed discussion to follow later, of the operation of the brake and signal light system 10 may be understood with reference to FIG. 1. When an operator of a vehicle manipulates a control input of the signaling circuitry 18, such as pressing a brake lever, a current is passed through the signaling circuitry 18 and is sensed by the transmitter assembly 16. In response, the transmitter assembly 16, then broadcasts a coded radio-frequency (RF) signal 22 with a command code to the receiver 20. Upon receiving the RF signal 22 with the command signal, the receiver 20 illuminates at least one light source 24 indicating the state of the signaling circuitry 18 of the vehicle.

Figure 3:
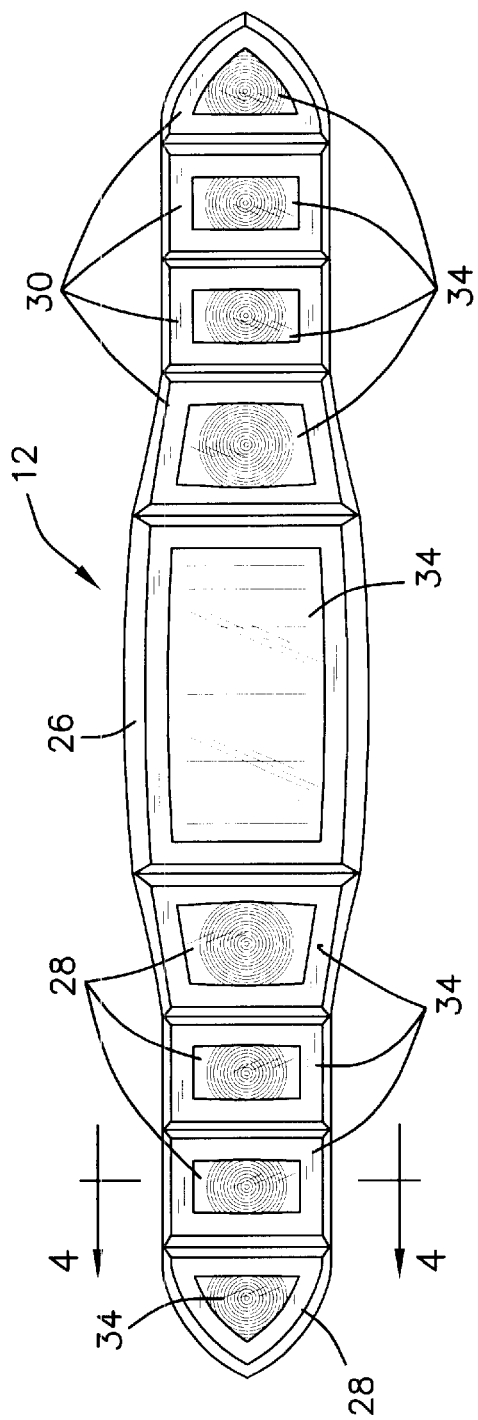
FIG. 3 is a front elevation view of the improved brake and signal light system of the present invention.

With reference to FIGS. 2 and 3, the housing assembly 12 includes a central housing 26, at least one left segmented housing 28, and at least one right segmented housing 30. As illustrated in FIGS. 2 and 3, the housing assembly includes four segmented left housings 28 and four right segmented housings 30. It should be appreciated that any number or combination of segmented right or left housings may be employed with the present invention without departing from the true scope and purpose thereof. Preferably, at least one left segmented housing 28 and at least one right segmented housing 30 are used. The segmented left housing 28 and the segmented right housing 30 are positioned on either side of the central housing 12 and connected thereto by a flexible back member 32 (illustrated in FIG. 4). If more than one left segmented housing 28 is used, each housing is attached to one another in a side-by-side relationship by the flexible back member 32. Like the left segmented housings 28, if more than one right segmented housing 30 is used, they are coupled to one another in the same fashion as the left segmented housings 28.

The central housing 26, the left segmented housings 28, and the right segmented housings 30 are each fitted with a lens element 34. It is preferred that at least one lens element 34 is used with each left segmented housing 28, the central housing 26, and each right segmented housing 30. The lens elements 34 are used to project the light source 24 contained within each housing outward from the housing so as to increase the intensity and brightness of the illuminated light sources. The lens elements 34 may be of any typical lens used with signal light assemblies for vehicles, such as those used with brake lights, turn indicators, running lights or hazard lights. The lenses may also be convex or concave or they may include prismatic elements typically used to focus the light source or they may be of the fresnel type or any combination thereof.

Preferably, the housing assembly 12 is constructed from an impact resistant plastic material such as but not limited to Acrylonitrile butadiene acrylate (ABS), Polycarbonate (PC), Polyethylene (PE), or Polyvinyl chloride (PVC). The flexible back member 32 is constructed from an elastomeric plastic having a high resistance to plastic deformation and a high fatigue rating. Such a material suitable for use in constructing the back member 32 may be Polypropylene (PP). It is important to note that the above mentioned materials have been discussed as exemplary purposes only, and that many different types of plastics, metals, alloys or any combination thereof may be employed for constructing the present invention with out departing from the scope of the invention.

Figure 3A:
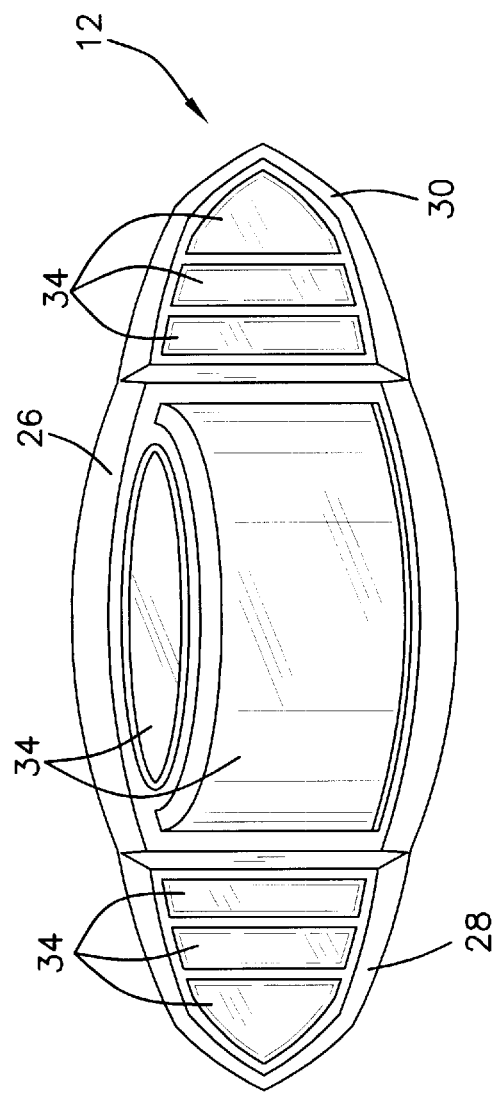
FIG. 3a is a front elevation view of an alternate embodiment of the improved brake and signal light system of the present invention.

Turning to FIG. 3a, an alternate embodiment of the housing assembly 12 is illustrated has having a central housing 26, a left segmented housing 28, and a right segmented housing 30. This example illustrates how an alternate embodiment of the housing 12 may be constructed with out departing from the scope of the present invention. As such, this example includes a central housing 26 having two lens elements 34, a left segmented housing 28 having 3 lens elements, and a right segmented housing 30 having 3 lens elements. The right and left segmented housings 30 and 28 are flexibly connected to the central housing 26 by a flexible back member 32. Like the preferred embodiment of the housing 12 illustrated in FIG. 3, the housing illustrated in this figure may also be constructed with the same materials as out line above.

Figure 4:
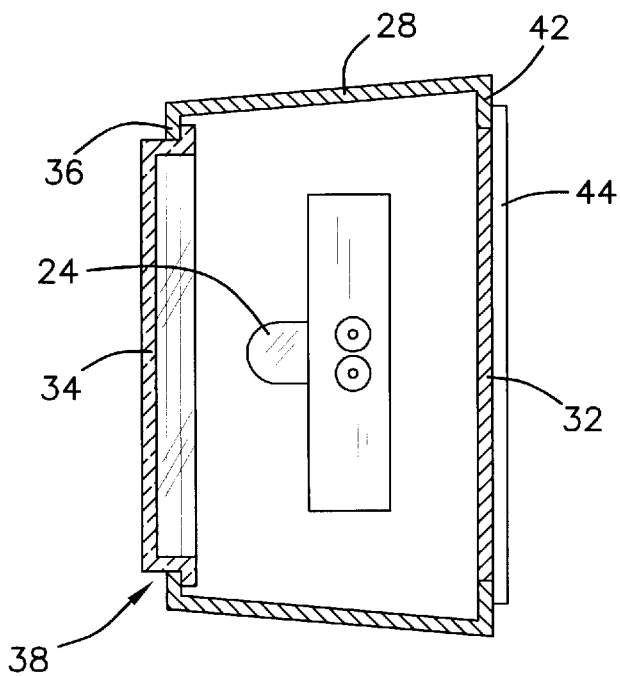
FIG. 4 is a cross-sectional view of the improved brake and signal light system of the present invention taken along line 4—4 in FIG. 3.

Now with reference to FIG. 4, a cross sectional view of one of the segmented housings taken along line 4—4 in FIG. 3 is illustrated. While this view illustrates a discrete left segmented housing 28 it is important to understand that the illustrated structural elements are the same with any segmented housing, rather it be a left segmented housing or a right segmented housing 30. The segmented housing is generally hollow and includes a front face 36 defining an aperture 38 therethrough, wherein a lens element 34 may be positioned therein. A light source 24, such as an LED, is positioned behind the lens element 34 so that the majority of the light produced by the light source is projected towards and through the lens element. A flexible back member 32 is attached to a rearward portion 42 of the segmented housing 28. An adhesive backing 44 may be applied to the flexible back member 32 so that the housing assembly 12 may be adhesively secured to a helmet.

The housing assembly 12 is constructed so that segmented housings are positioned in a side-by-side relationship to the central housing 12, one positioned on either side, with a slight distance therebetween defining a small gap. The distance may be slight greater than the thickness of the flexible back member 32, preferable the distance between the housings is equal to the thickness of the flexible back member. The flexible back member 32 is connected to both housings and spans the gap between the housings, thereby leaving a small segment of the flexible back member exposed. This segment provides for a hinged connection between the housings allowing the housings to flex or bend with respect to each other. The connection between the segmented housings and the central housing is repeated for each segmented housing attached to an adjacent segmented housing in the complete assembly. This construction is what provides for the flexibility of the housing assembly 12 so that the housing assembly may bend or flex to conform to the shape of the helmet to which it is attached.

Figure 5:
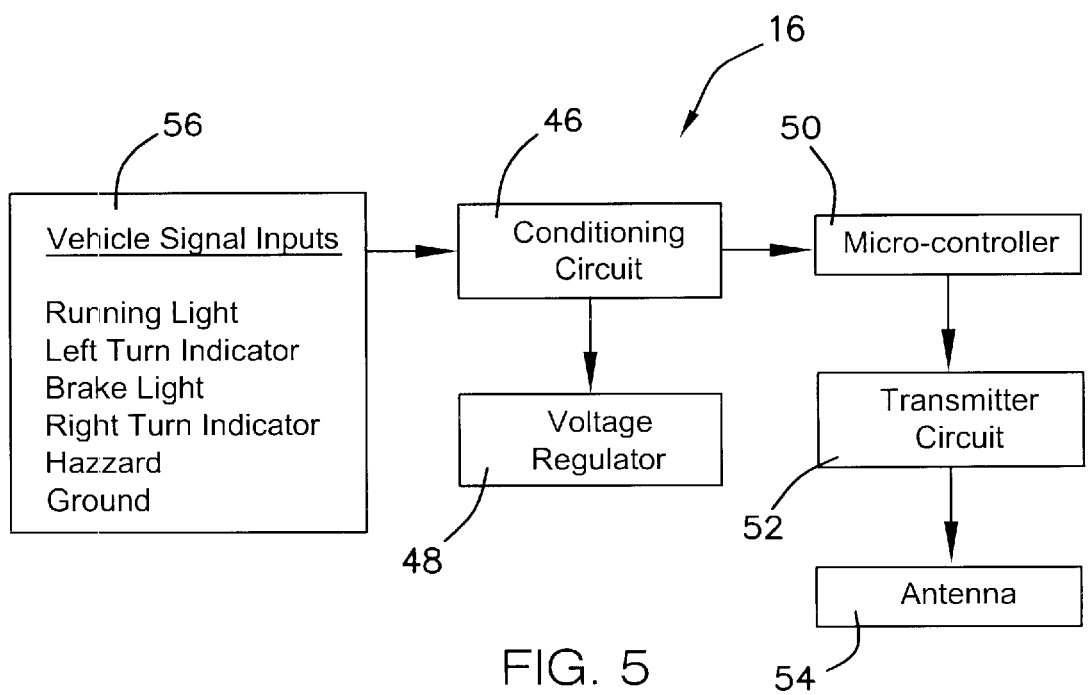
FIG. 5 is a diagrammatic view of the transmitter assembly of the brake and signal light system of the present invention.

Turning to FIG. 5, a more detailed understanding of the transmitter assembly 16 can be obtained. As shown in FIG. 5, a transmitter assembly 16 of the present invention may include a conditioning circuit 46, a voltage regulator 48, a micro-controller (MC) 50, such as micro-controller PIC16F8, a transmitter oscillator circuit (TOC) 52, such as MC13176 provided by Motorola, and an antenna 54. The micro-controller 50 may also be an 8-bit micro-controller. For the present invention, the transmitter assembly 16 is electrically connected to the signaling circuitry 18 of a vehicle for the purpose of receiving inputs 56. The inputs 56 may include voltage signals originating from the running lights, left turn indicator, brake light, right turn indicator or hazard lights of the vehicle. These inputs 56 are received by the conditioning circuit 46 and are conditioned to provide raw electrical power and signaling data. The raw electrical power is fed to the voltage regulator 48 where it is regulated to provide a source of steady electrical power to operate the transmitter assembly. The signaling data is fed to the micro-controller 50 and is processed to create a radio data pattern that indicates the state of the signaling circuitry 18. The radio data pattern may include a sync pattern for bit alignment, a header to identify the beginning of the radio data pattern, a command signal, and data area with redundancy to provide for error detection.

The radio data pattern is then fed to the TOC 52 where is it modulated onto a coded signal to be transmitted. The signal may be a radio signal. Preferably the radio signal is an amplitude key shifted signal. The signal is then fed to an antenna 54, such as a loop antenna and is transmitted.

Figure 6:
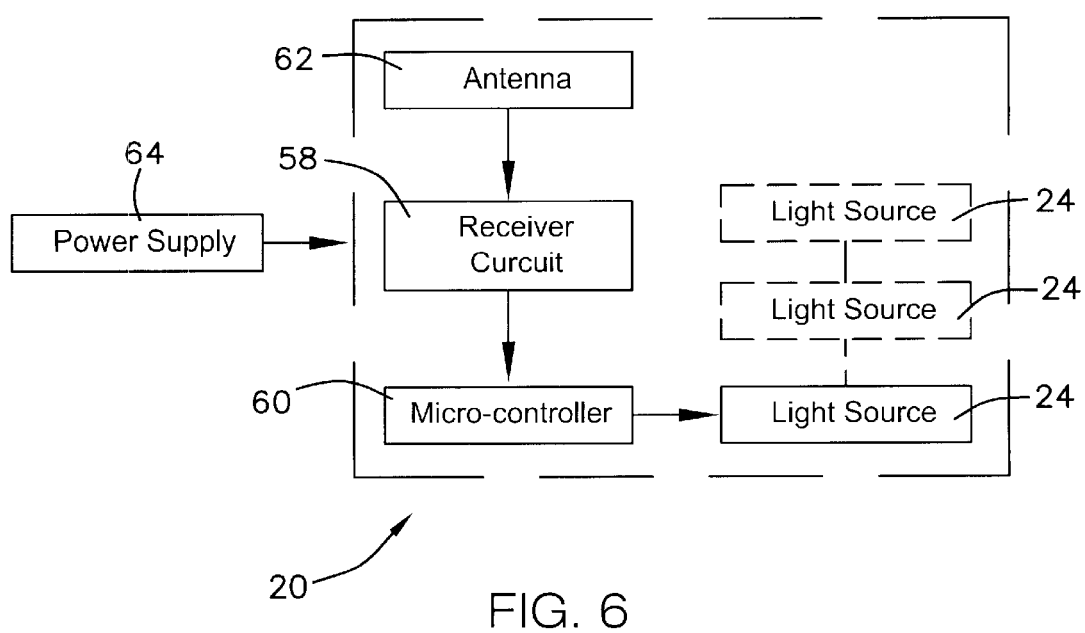
FIG. 6 is a diagrammatic view of the receiver assembly of the brake and signal light system of the present invention.

Turning to FIG. 6, a more detailed understanding of the receiver assembly 20 can be obtained. As shown in FIG. 6, a receiver assembly 20 of the present invention may include an receiver 58, such as an integrated receiver circuit MICRF0/22 provided by Qwick Radio, a micro-controller 60, such as a PIC16F84 provided by Motorola, and an antenna 62. The micro-controller 60 may also be an 8-bit micro-controller 481 The coded signal is received and demodulated by the receiver 58 and is then fed to the micro-controller 60. The micro-controller 60 then examines the signal to authenticate the signal as originating from the appropriate transmitter assembly 16, to determine if there are any errors, and to decode the command signal. If it is determined the signal originated from the correct transmitter assembly and the signal contains no errors, then a break, left, right or right lighting sequence is performed by illuminating at least one light source 24 according to the command signal.

In operation, a current is passed through the signaling circuitry of the vehicle by an operator manipulating a control element of the vehicle, such as a brake lever or a turn signal lever. This current is received by the conditioning circuit 46 of the transmitter assembly 16 and is conditioned to provide a raw electrical power and signaling data. The phrase raw electrical power means power, which has not been altered or regulated. This raw electrical power is fed to the voltage regulator 48 which in turn generates a steady supply voltage to power the transmitter assembly 16. With this construction, an additional power source, such as a battery, or connection with the vehicle's power supply is not required, thus making the installation of the transmitter less complicated.

The signaling data is fed to the first micro-controller 50 of the transmitter assembly 16 where it processed to create a radio data pattern. The radio date pattern may include a sync pattern for bit alignment, a header to identify the beginning of the radio pattern, a command signal, and a data area with redundancy to allow for error detection. This radio data pattern is fed to the transmitter circuit 52 where it is modulated on a radio-frequency signal and then broadcasted. The radio-frequency signal is coded with a unique code to a particular transmitter/receiver pair. This allows multiple transmitter/receiver pair to operate within close proximity to each other with out experiencing interference or erroneous commands.

The broadcasted signal is received by the receiver circuit 58 where it is demodulated and then fed to the second micro-controller 60. The signal is then processed to check for signal authenticity to insure the received signal originated from the correct source. If the signal is verified as an authentic signal, it is further processed to decode a command signal and to check the signal for possible errors. If no errors exist the command signal illuminates at least one light source 24 to indicate the state of the signaling circuitry of the vehicle. A power source 64, such as a battery is also provided to power the transmitter and to power the light source. To save power, the transmitter assembly 20 is duty cycled and only operated intermittently.

While a preferred embodiment of the brake and signal light system has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A brake and signal light system comprising:
    a transmitter assembly adapted for electrical connection to the signaling circuitry of a vehicle, said transmitter assembly for transmitting a coded signal in response to an electrical signal generated by said signaling circuitry;
    a receiver assembly for receiving said coded signal and producing a control signal in response to said encoded signal;
    at least one light source connected to said receiver assembly, wherein said control signal illuminates said at least one light source;
    a housing assembly, said housing assembly adapted to receive said receiver assembly and said at least one light source therewithin, and wherein said housing assembly is attachable to a helmet and is flexible to conform to the shape of said helmet;
    a conditioning circuit, wherein said conditioning circuit receives said electrical signal generated by said signaling circuitry, said conditioning circuit for producing raw electrical power and signaling data;
    a voltage regulator, said voltage regulator for receiving said raw power and for providing a steady supply voltage to power said transmitter assembly;
    a micro-controller, said micro-controller for receiving said signaling data and producing a radio data pattern; and
    said transmitter assembly including a transmitter circuit for modulating said radio data pattern onto a radio signal.

2. The brake and signal light system of claim 1, wherein the coded signal is a radio bit alignment, a header, a command signal, and data area with redundancy.

3. The brake and signal light system of claim 2, wherein the radio signal is an amplitude shift keyed signal.

4. The brake and signal light system of claim 1, wherein said radio data pattern includes a sync pattern, a header, a command signal, and data area with redundancy.

5. The brake and signal light system of claim 1, wherein the receiver assembly is operated intermittently to save power.

6. The brake and signal light system of claim 1, wherein the receiver assembly includes:
    a receiver;
    a micro-controller, wherein said receiver demodulates said coded signal and feeds it to said micro-controller, said micro-controller for generating said control signal; and
    a power source for powering said receiver assembly.

7. The brake and signal light system of claim 1, wherein said housing assembly comprises:
    a central housing;
    a least one segmented right housing;
    a least one segmented left housing; and
    a flexible back member, wherein said at least one segmented right housing and said at least one segmented left housing are secured in spaced relationship to either side of said central housing by said flexible back member so as to leave a gap between said at least one segmented right housing, said central housing and said at least one segmented right housing so that said flexible back member provides for a hinged connection between said at least one segmented housing and said central housing and between said at least one segmented left housing and said central housing allowing said housing assembly to conform to the shape of a helmet to which it is attached.

8. The brake and signal light system of claim 7, wherein a lens element is secured to said central housing, said at least one segmented right housing and said at least one segmented left housing for projecting said at least one light source outwardly from said housing assembly.

9. The brake and signal light system of claim 8, wherein said lens element of said at least one segmented right housing and of said at least one segment left housing is a fresnel lens.

10. A wireless brake and signal light system for attachment to a helmet, comprising:
    a transmitter assembly adapted for electrical connection to the signaling circuitry of a vehicle, said transmitter assembly for transmitting a radio signal in response to an electrical signal generated by said signaling circuitry;
    a receiver assembly for receiving said radio signal and producing a control signal in response to said radio signal, said receiver assembly operated intermittently to save power;
    at least one light source connected to said receiver assembly, wherein said control signal illuminates said at least one light source;

a housing assembly, said housing assembly adapted to receive said receiver assembly and said light source therewithin, and wherein said housing assembly is attachable to a helmet and flexible to conform to the shape of said helmet;

wherein said transmitter assembly includes:

a conditioning circuit, wherein said conditioning circuit receives said electrical signal generated by said signaling circuitry, said conditioning circuit for producing raw electrical power and signaling data;

a voltage regulator, said voltage regulator for receiving said raw electrical power and for providing a steady supply voltage to power said transmitter assembly; and a first micro-controller, said first micro-controller for receiving said signaling data and producing a radio data pattern;

a transmitter circuit for modulating said radio data pattern onto said radio signal;

wherein said receiver assembly includes:

a receiver;

a second micro-controller, wherein said receiver demodulates said radio signal and feeds it to said second micro-controller, said second micro-controller for generating said control signal; and a power source for powering said receiver assembly.

11. The wireless brake and signal system for attachment to a helmet of claim 10, wherein said radio signal comprising a radio data pattern including a sync pattern, a header, a command signal, and data area with redundancy.

12. The wireless brake signal system for attachment to a helmet of claim 10, wherein said housing assembly comprises:

a central housing;

a least one segmented right housing;

a least one segmented left housing; and a flexible back member, wherein said segmented right housing and said segmented left housing are secured in spaced relationship to either side of said central housing by said flexible back member, said flexible back member secured to said central housing, said at least one segmented left housing and said at least one segmented right housing so as to leave a gap between said at least one segmented right housing, said central housing and said at least one segmented right housing so that said flexible back member provides for a hinged connection between said at least one segmented housing and said central housing and between said at least one segmented left housing and said central housing allowing said housing assembly to conform to the shape of a helmet to which it is attached.

13. The wireless brake signal system for attachment to a helmet of claim 12, wherein a lens element is secured to said central housing, said segmented right housing and said segmented left housing for projecting said a least one light source outwardly from said housing assembly.

14. The brake and signal light system of claim 13, wherein said lens element of said at least one segmented right housing and of said at least one segment left housing is a fresnel lens.

15. A method of illuminating a wireless brake and signal light system comprising the steps of:

connecting a transmitter assembly to the signaling circuitry of a vehicle, said transmitter assembly comprising a signal conditioning circuit, a voltage regulator, a first micro-controller, and a transmitter circuit;

mounting a light housing assembly containing a receiver assembly and at least one light source to a helmet, said light housing assembly being flexible, said receiver assembly comprising a receiver circuit and a second micro-controller;

passing a current through said signaling circuitry, said current being received by said conditioning circuit;

conditioning said current by said conditioning circuit so as to provide electrical power and signaling data, said electrical power being received by said voltage regulator to provide a steady supply voltage to power said transmitter assembly, said signaling data being received by said first micro-controller;

processing said signaling data by said first micro-controller to produce a radio data pattern, said radio data pattern being received by said modulation circuit;

modulating said radio data pattern by said transmitter circuit on to a radio signal;

broadcasting said radio signal, said radio signal being received by said receiver assembly;

demodulating said radio signal by said receiver circuit to produce a demodulated signal, said demodulated signal being received by said second micro-controller;

processing said demodulated signal by said second micro-controller to produce a command signal; and illuminating said at least one light source by said command signal.

16. A method as recited in claim 15, wherein said receiver assembly is operated intermittently to reduce power consumption.

17. A method as recited in claim 15, wherein said radio data pattern includes a sync pattern, a header, a command signal, and data redundancy.

18. A method as recited in claim 15, further comprising the step of:

processing said demodulated signal by said second micro-controller to check for authenticity of said radio signal and to determine if errors exist in said radio data pattern.

* * * * *